US012444838B2

(12) United States Patent
Zhang et al.

(10) Patent No.: US 12,444,838 B2
(45) Date of Patent: Oct. 14, 2025

(54) RADIO FREQUENCY DEVICE, MULTI-BAND PHASE SHIFTER ASSEMBLY, ANTENNA SYSTEM, AND BASE STATION ANTENNA

(71) Applicant: Outdoor Wireless Networks LLC, Claremont, NC (US)

(72) Inventors: Ting Zhang, Suzhou (CN); Chen Chen, Suzhou (CN); Fangwen Wan, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 213 days.

(21) Appl. No.: 18/139,073

(22) Filed: Apr. 25, 2023

(65) Prior Publication Data

US 2023/0344123 A1 Oct. 26, 2023

(30) Foreign Application Priority Data

Apr. 26, 2022 (CN) ......................... 202210446082.7

(51) Int. Cl.
*H01Q 15/00* (2006.01)
*H01Q 3/36* (2006.01)

(52) U.S. Cl.
CPC ........... *H01Q 3/36* (2013.01); *H01Q 15/0086* (2013.01)

(58) Field of Classification Search
CPC .. H01Q 3/36; H01Q 3/30; H01Q 3/32; H01Q 1/38; H01Q 1/50; H01Q 1/51; H01Q 1/246; H01Q 15/0086; H01P 1/2005; H01P 1/184; H01P 1/18
See application file for complete search history.

(56) References Cited

U.S. PATENT DOCUMENTS 7,907,096 B2 * 3/2011 Timofeev ................. H01Q 3/32 333/156
2022/0278440 A1 * 9/2022 Kim ....................... H01Q 1/521

FOREIGN PATENT DOCUMENTS

| | | | | | |
|---|---|---|---|---|---|
| CN | 104638366 | A | * | 5/2015 | |
| CN | 106848583 | A | * | 6/2017 | H01Q 1/38 |
| CN | 107240770 | A | * | 10/2017 | H01Q 1/38 |
| CN | 107785661 | A | * | 3/2018 | H01Q 1/38 |
| CN | 108923122 | A | * | 11/2018 | H01Q 1/38 |
| CN | 112290203 | A | * | 1/2021 | H01Q 1/36 |
| CN | 112635993 | A | * | 4/2021 | H01Q 1/246 |
| CN | 112736458 | A | * | 4/2021 | |
| CN | 117060065 | A | * | 11/2023 | H01Q 1/38 |
| EP | 3501244 | B1 | * | 2/2023 | H01L 28/10 |
| WO | WO-2018120196 | A1 | * | 7/2018 | H01P 1/18 |
| WO | WO-2021040062 | A1 | * | 3/2021 | H01Q 1/24 |

* cited by examiner

*Primary Examiner* — Seokjin Kim
(74) *Attorney, Agent, or Firm* — Myers Bigel, P.A.

(57) ABSTRACT

A radio frequency device, multi-band phase shifter assembly, an antenna system and a base station antenna in which metasurface decoupling elements between transmission lines are provided. For example, a radio frequency device may include: a substrate; a first transmission line printed on a first major surface of the substrate; a second transmission line adjacent the first transmission line printed on the first major surface of the substrate; a metasurface decoupling element printed on the first major surface of the substrate, where the metasurface decoupling element is arranged between the first transmission line and the second transmission line.

20 Claims, 7 Drawing Sheets

RADIO FREQUENCY DEVICE, MULTI-BAND PHASE SHIFTER ASSEMBLY, ANTENNA SYSTEM, AND BASE STATION ANTENNA

CROSS-REFERENCE TO RELATED APPLICATION

The present application claims the benefit of priority to Chinese Patent Application No. 202210446082.7, filed on Apr. 26, 2022, with the China National Intellectual Property Administration, and the entire contents of the above-identified application are incorporated by reference herein.

TECHNICAL FIELD

The present disclosure generally relates to base station antennas, and more specifically, to a radio frequency device, a multi-band phase shifter assembly, an antenna system, and a base station antenna.

BACKGROUND

Cellular communications systems are well known in the art. In a cellular communications system, a geographic area is divided into a series of sections that are referred to as “cells” which are served by respective base stations. The base station may include one or more base station antennas that are configured to provide two-way radio frequency (“RF”) communications with mobile subscribers that are within the cell served by the base station.

In order to accommodate the ever-increasing volumes of cellular communications, cellular operators have added cellular services in a variety of new frequency bands. In some cases, it is possible to use linear arrays of so-called “wide-band” or “ultra wide-band” radiating elements to provide service in multiple frequency bands. For example, a radiating element operating within a frequency range of 1.7 to 2.7 GHz can be used to support cellular services in multiple different frequency bands that are at least partially within the frequency range. Base station antennas may also typically include multiple radiating element arrays that are designed to operate in different frequency bands. For example, in a common multi-band antenna system, the antenna may have at least one linear array of one or more “low-band” radiating elements providing service in some or all of 617 to 960 MHz frequency bands (for example, Digital Dividend and/or GSM900 at 790 to 862 MHz) and at least one linear array of “medium-band” radiating elements providing service in some or all of, for example, 1427 to 2690 MHz frequency bands (for example, UTMS and/or GSM1800 at 1920 to 2170 MHz). However, the multi-band antenna often has an increased width to accommodate the increased number of radiating element arrays. Due to local zoning ordinances and/or weight/wind loading constraints for antenna towers, there are often limitations on the sizes of base station antennas that can be deployed at a given base station. These constraints may effectively limit the number of radiating element arrays that may be included in the multi-band antenna.

Most modern multi-band antennas include phase shifters that are used to adjust the down tilt angle of the radiation patterns or “antenna beams” generated by the radiating element arrays. Such down tilt angle adjustment may be used to adjust the coverage area of each radiating element array.

However, with the integration of more and more frequency bands and more and more functional modules (for example, phase shifters, filters, coaxial cables and radiating element arrays, etc.) in the base station antenna, the installation space and/or operation space (such as welding space) in the base station antenna is further restricted. This causes the design size of some radio frequency devices, for example, phase shifters or filters, to be subject to strict restrictions. A limited design size may result in smaller gaps between transmission lines within the radio frequency device, creating coupling interference between transmission lines that may negatively affect radio frequency performance of the radio frequency device. This is undesirable.

SUMMARY

An object of the present disclosure (but not the only object of the present disclosure) is to provide a radio frequency device, a multi-band phase shifter assembly, an antenna system, and a base station antenna that are capable of overcoming at least one of the defects in the prior art.

According to a first aspect of the present disclosure, a radio frequency device is provided, and the radio frequency device may include: a substrate; a first transmission line printed on a first major surface of the substrate; a second transmission line adjacent the first transmission line and printed on the first major surface of the substrate; a metasurface decoupling element printed on the first major surface of the substrate, where the metasurface decoupling element is arranged between the first transmission line and the second transmission line.

According to a second aspect of the present disclosure, a multi-band phase shifter assembly is provided, and the multi-band phase shifter assembly may include: a first phase shifter, configured to perform a phase shift operation on sub-components of a first radio frequency signal in a first frequency band; a second phase shifter, configured to perform a phase shift operation on sub-components of a second radio frequency signal in a second frequency band, the second frequency band being different from the first frequency band; and a plurality of first filters which are configured to pass the first radio frequency signal while blocking the second radio frequency signal, where an input of each first filter is connected to a corresponding output port of the first phase shifter. The multi-band phase shifter assembly may also include a plurality of second filters which are configured to pass a second radio frequency signal while blocking the first radio frequency signal, where an input of each second filter is connected to a corresponding output port of the second phase shifter; a first metasurface decoupling element, arranged within a first gap between two adjacent first filters; and a second metasurface decoupling element, arranged within a second gap between two adjacent second filters.

According to a third aspect of the present disclosure, an antenna system is provided, and the antenna system may include a multi-band phase shifter assembly according to some embodiments of present disclosure; a radiating element array, which is configured to operate in at least a first frequency band and a second frequency band, wherein a common output port of the multi-band phase shifter assembly is electrically connected with at least a part of the radiating elements in the radiating element array.

According to a fourth aspect of the present disclosure, a base station antenna is provided, the base station antenna includes the radio frequency device according to some embodiments of present disclosure or includes the antenna system according to some embodiments of present disclosure.

The above and other aspects and objects of the present disclosure will be described herein, and/or will be apparent based on the description provided herein.

BRIEF DESCRIPTION OF THE DRAWINGS

The present disclosure will be explained in greater detail by means of specific embodiments with reference to the attached drawings. The drawings are briefly described as follows.

DETAILED DESCRIPTION

Figure 1:
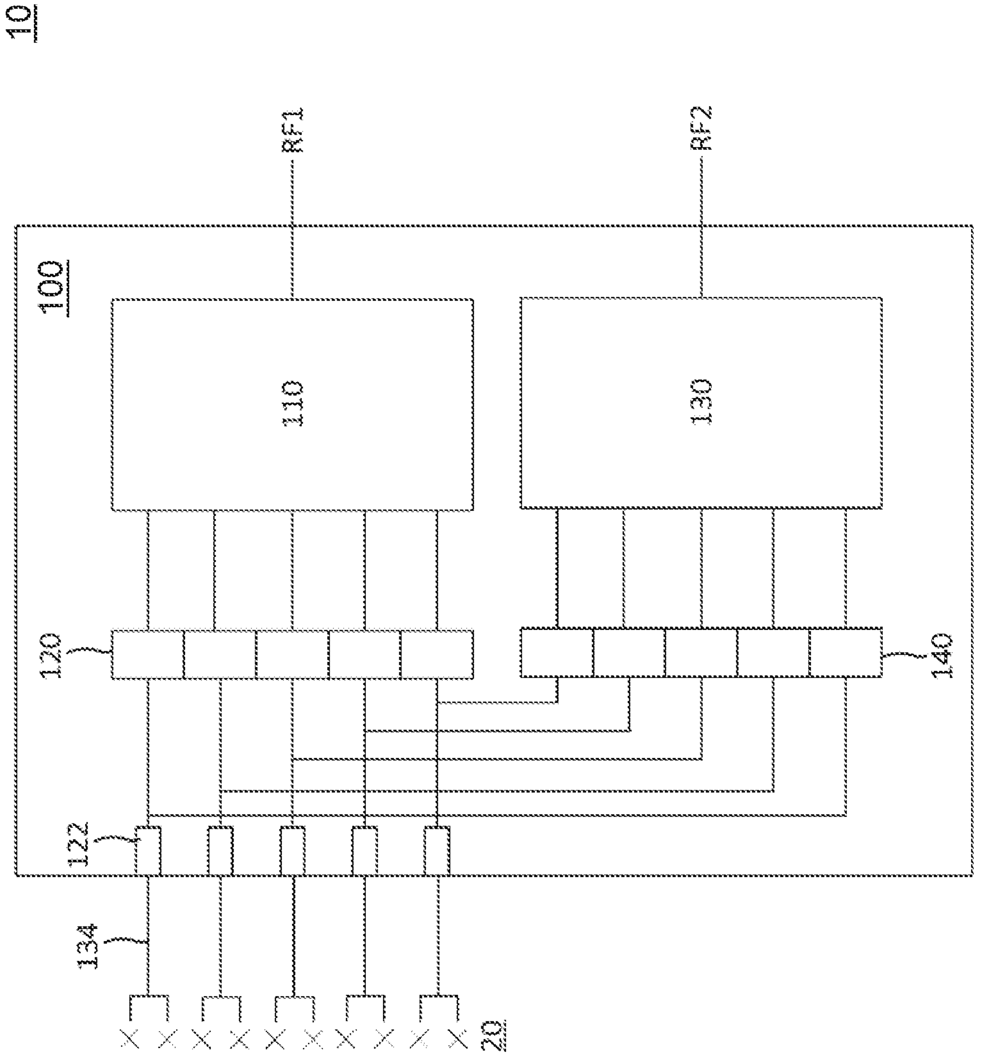
FIG. 1 is a block diagram of an antenna system according to some embodiments of the present disclosure.

The present disclosure will be described below with reference to the attached drawings, which illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

As used herein, spatial relationship terms such as "upper," "lower," "left," "right," "front," "back," "high," and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B," not exclusively "A" or "B," unless otherwise specified.

As used herein, the term "schematic" or "exemplary" means "serving as an example, instance or explanation," not as a "model" to be accurately copied". Any realization method described exemplarily herein may not be necessarily interpreted as being preferable or advantageous over other realization methods.

As used herein, the word "basically" means including any minor changes caused by design or manufacturing defects, device or component tolerances, environmental influences, and/or other factors.

In addition, for reference purposes only, "first," "second" and similar terms may also be used herein, and thus are not intended to be limitative. For example, unless the context clearly indicates, the words "first," "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

The present disclosure proposes a radio frequency device, which may be realized as a printed circuit board, which may include a dielectric substrate, a first transmission line and a second transmission line printed on a first major surface of the substrate, and a metasurface decoupling element printed between the first transmission line and the second transmission line. The metasurface decoupling element may be configured to at least partially reduce undesirable coupling between the first transmission line and the second transmission line, thereby improving radio frequency performance of the radio frequency device. When the coupling between the first transmission line and the second transmission line is capacitive coupling, the metasurface decoupling element may be configured as an inductive decoupling element at least within the operating frequency band of the radio frequency device so as to at least partially cancel the capacitive coupling between the first transmission line and the second transmission line. When the coupling between the first transmission line and the second transmission line is inductive coupling, the metasurface decoupling element may be configured as a capacitive decoupling element at least within the operating frequency band of the radio frequency device so as to at least partially cancel the inductive coupling between the first transmission line and the second transmission line.

The metasurface decoupling element may include or be configured as a plurality of periodically arranged metal pattern units. The frequency characteristics of the metasurface decoupling element may be adjusted by changing the shape, number, and/or arrangement of the metal pattern units in order to better adapt to the coupling characteristics between the first transmission line and the second transmission line.

It should be understood that the radio frequency device of the present disclosure may be a variety of functional devices applied in base station antennas, and is not limited to the type of devices described in specific embodiments. In some embodiments, the radio frequency device may be a phase shifter or a power divider. In other example embodiments, the radio frequency device may be a filter, a duplexer, a combiner, a feed board or the like.

Next, the radio frequency device of some embodiments of the present disclosure is described in detail using a multi-band phase shifter assembly as an example.

FIG. 1 is a block diagram of an antenna system according to some embodiments of the present disclosure. The antenna system 10 may include at least one radiating element array 20 (which may be configured as a wideband radiating element array 20 capable of operating in a first frequency band and a second frequency band) and a radio frequency device configured as a multi-band phase shifter assembly 100. The multi-band phase shifter assembly 100 may be configured to receive one or more radio frequency signals in different frequency bands from a radio device (e.g., a radio), and feed the corresponding radio frequency signals to the radiating element array 20 after performing a phase shift operation on sub-components of the corresponding radio frequency signals 20. As shown in FIG. 1, the multi-band phase shifter assembly 100 may include first and second RF ports that are configured to receive respective a first and second radio frequency signals RF1, RF2 that are in respective first and second frequency bands, first and second phase shifters 110, 130, and first and second filter banks 120, 140. Each filter bank 120, 140 may include a plurality of individual filters such as diplexers. The multi-band phase shifter assembly 100 is configured to receive the first radio frequency signal RF1 (e.g., from a first radio) and to feed each phase-shifted sub-component of the first radio frequency signal RF1 to the radiating element array 20, and to receive the second radio frequency signal RF2 (e.g., from a second radio) and to feed each phase-shifted sub-component of the second radio frequency signal to the radiating element array 20.

Figure 2:
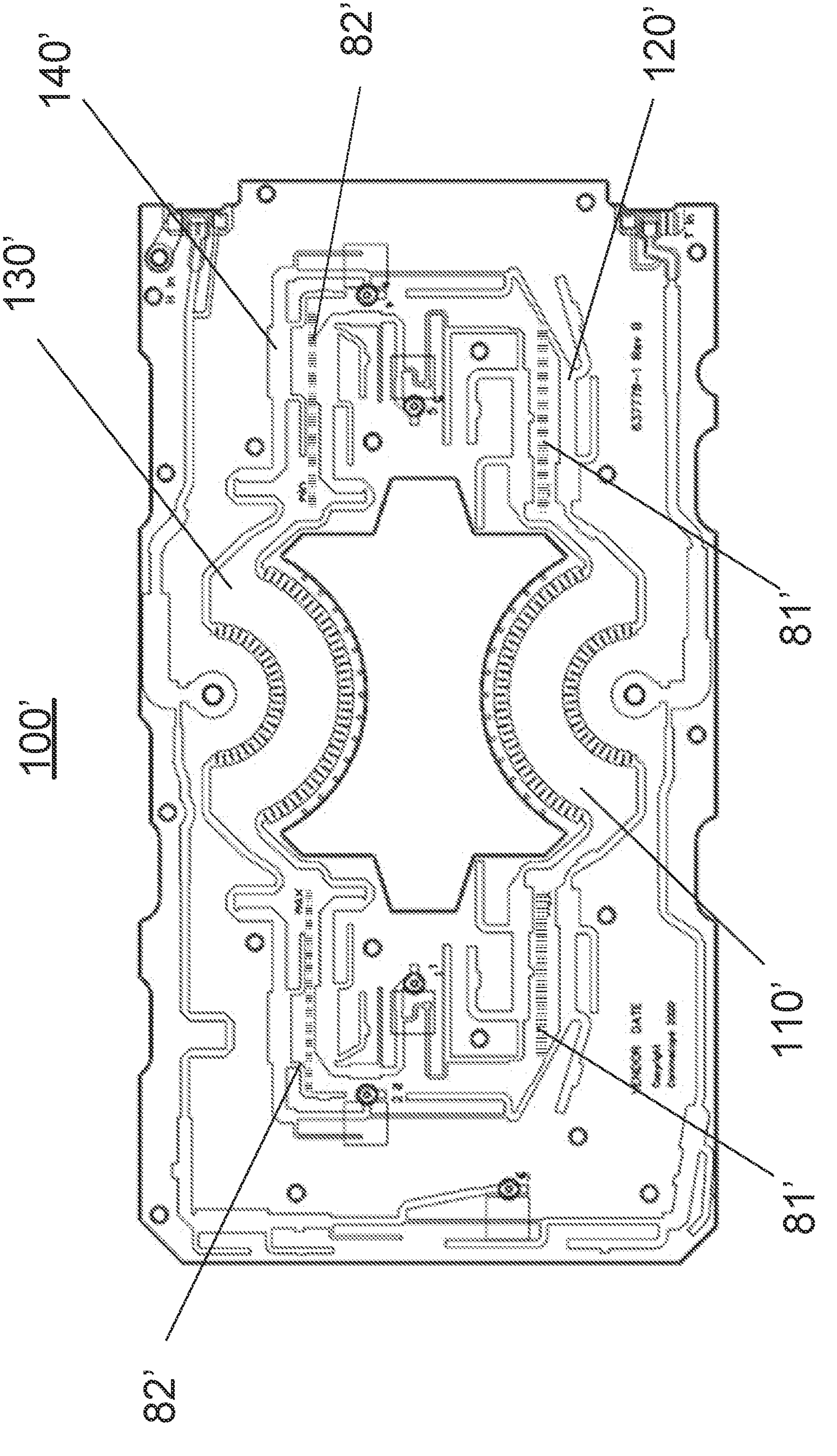
FIG. 2 is a front view of a multi-band phase shifter assembly according to a first embodiment of the present disclosure.

FIG. 2 is a front view of a multi-band phase shifter assembly 100' according to a first embodiment of the present disclosure that may be used to implement the multi-band phase shifter assembly of FIG. 1. The multi-band phase shifter assembly 100' may include a first phase shifter 110' for a first radio frequency signal of a first frequency band, a first filter bank 120' coupled to the first phase shifter 110', a second phase shifter 130' for a second radio frequency signal of a second frequency band, and a second filter bank 140' coupled to the second phase shifter 130' In a first embodiment, the first phase shifter 110' and the second phase shifter 130' are designed to be arranged side by side in the vertical direction on the same plane. Each filter bank 120', 140' may include a plurality of individual filters, such as diplexers.

Figure 3:
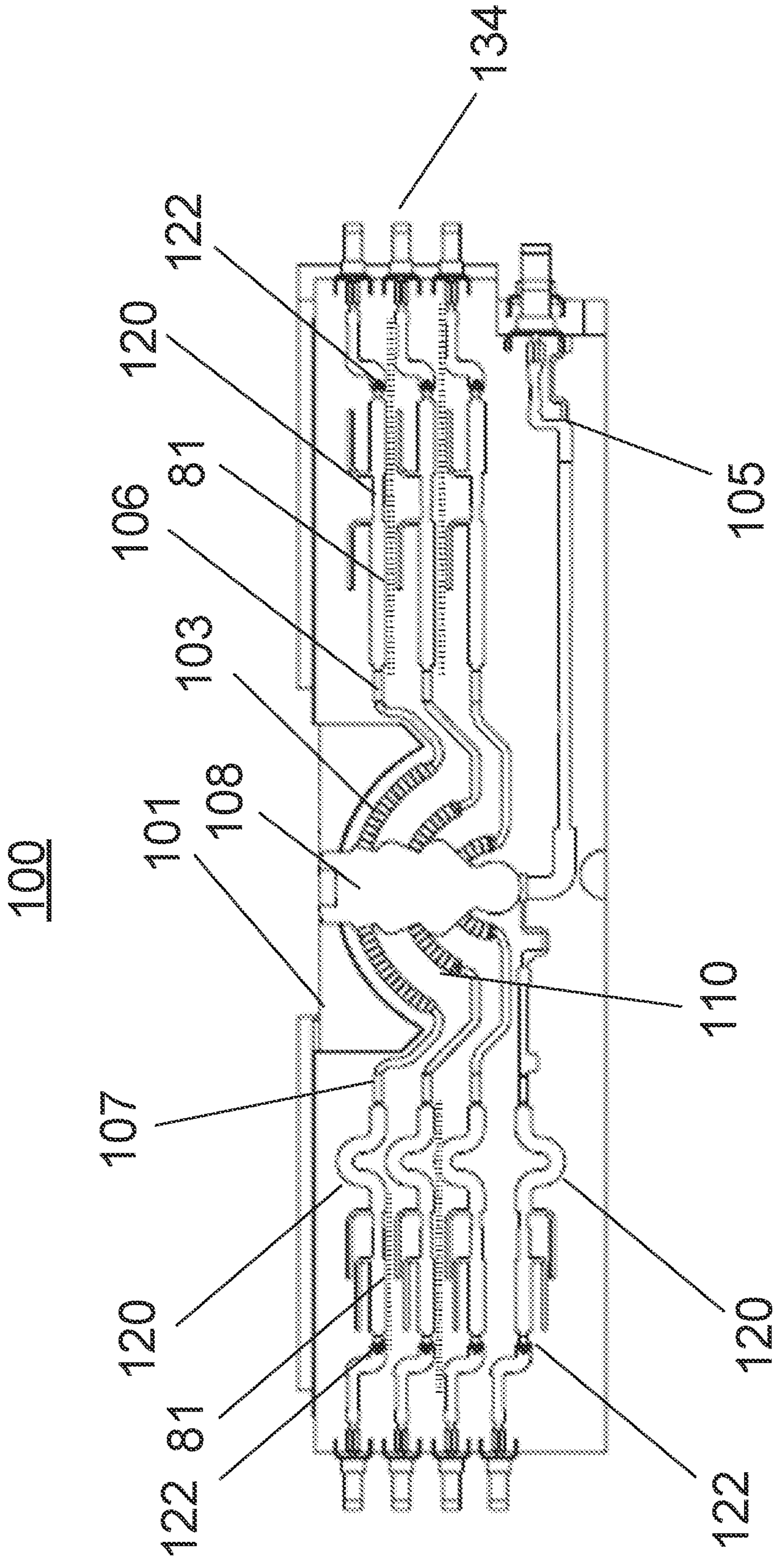
FIG. 3 is a front view of a multi-band phase shifter assembly according to a second embodiment of the present disclosure.
Figure 4:
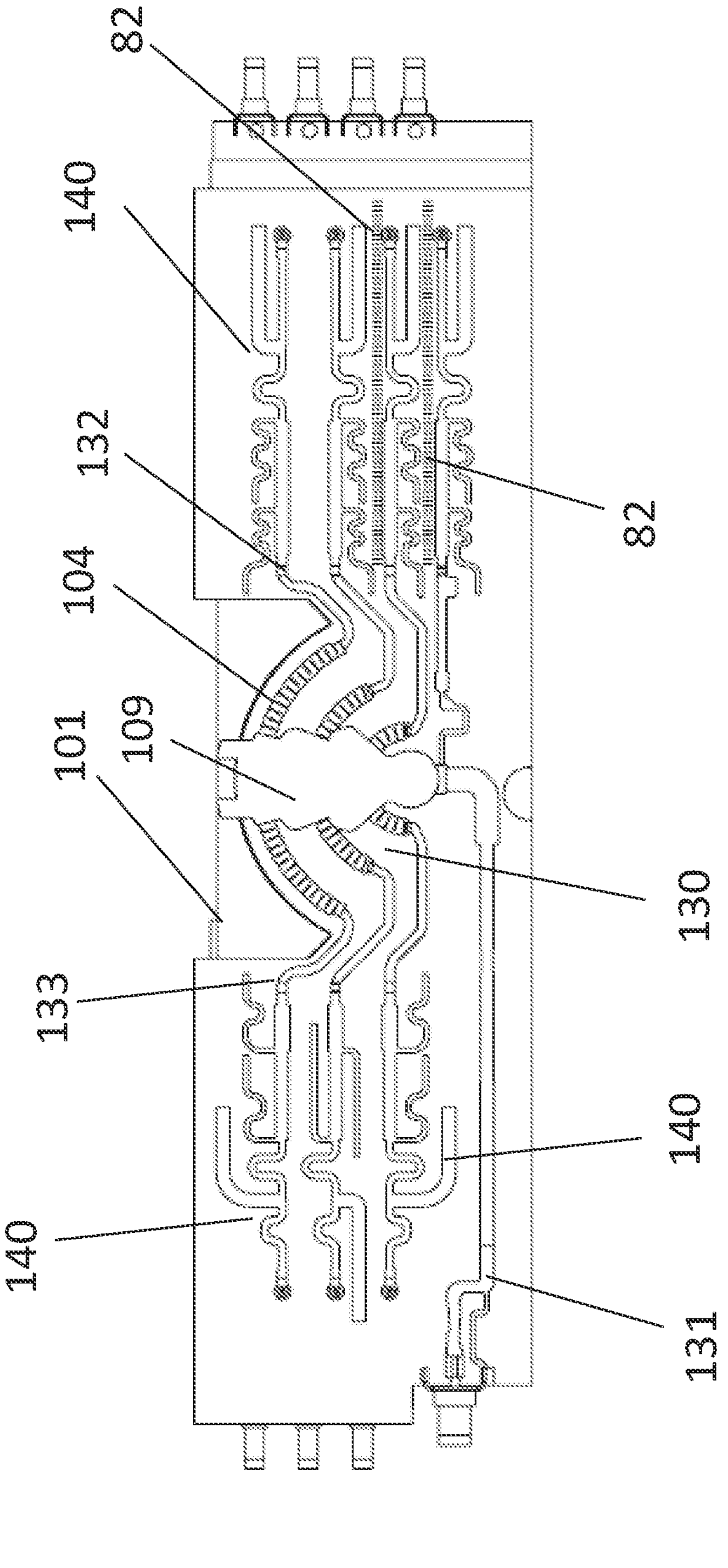
FIG. 4 is a back view of the multi-band phase shifter assembly of FIG. 3.

FIG. 3 is a diagram of the multi-band phase shifter assembly 100 according to a second embodiment of the present disclosure that corresponds to the multi-band phase shifter assembly 100 of FIG. 1. FIG. 4 shows a back-side view of the multi-band phase shifter assembly 100 of FIG. 3.

As shown in FIG. 3 and FIG. 4, the multi-band phase shifter assembly 100 may include a substrate 101 (for example, a dielectric substrate), a first phase shifter 110 configured to perform a phase shift operation on sub-components of the first radio frequency signal in the first frequency band, a first filter bank 120 coupled to the first phase shifter 110, a second phase shifter 130 configured to perform a phase shift operation on sub-components of the second radio frequency signal in the second frequency band, and a second filter bank 140 coupled to the second phase shifter 130.

Each phase shifter 110, 130, 110', and 130' in the multi-band phase shifter assemblies 100 and 100' according to first and second embodiments of the present disclosure may be configured as a variable differential, arcuate phase shifter or a rotary wiper arm phase shifter as described in U.S. Pat. No. 7,907,096 (incorporated into the present disclosure by reference). In the corresponding arcuate phase shifter, a rotatable wiper arm couples sub-components of an RF signal to selected positions along one or more fixed arc-shaped transmission lines.

Unlike the multi-band phase shifter assembly 100' according to the embodiment of FIG. 2, the first phase shifter 110 and the second phase shifter 130 of the multi-band phase shifter assembly 100 according to the embodiment of FIG. 3 may form a superimposed structure. The first phase shifter 110 may be arranged on a first surface of the substrate 101, and the second phase shifter 130 may be arranged on a second surface of the substrate 101 opposite the first surface.

Next, this superimposed structure of the multi-band phase shifter assembly 100 of the second embodiment of the present disclosure will be described in detail with reference to FIGS. 3 to 7.

As shown in FIGS. 3 and 4, the first phase shifter 110 and the second phase shifter 130 may be respectively configured as, for example, a rotary wiper arm phase shifter. As shown in FIG. 3, the first rotary wiper arm phase shifter 110 may include a first input port 105, a first output port 106, a second output port 107, a first printed trace 103 (an arc-shaped transmission line in the drawing) and a first wiper arm 108 electrically connected between the input port 105 and both the first output port 106 and the second output port 107. In some embodiments, the first wiper arm 108 may be configured as a first wiper arm PCB, and a first coupling portion and a second coupling portion are electrically connected to each other and printed on the first wiper arm PCB. The first coupling portion is coupled to the first input port 105 of the first rotary wiper arm phase shifter 110 via a printed trace, and the second coupling portion is coupled to the first printed trace. The first wiper arm 108 may be configured to couple the first input port 105 to the first printed trace 103 and to be capable of sliding relative to the first printed trace 103 so as to adjust the phase change experienced by the sub-components of the RF signal received at the first input port 105 that are output at the corresponding output ports 106 and 107. In other words, the rotatable first wiper arm 108 is configured to couple the first and second sub-components of a first radio frequency signal to an adjustable position along the fixed arc-shaped transmission line 103 to perform a phase shift operation for the first and second sub-components of the first radio frequency signal that are output at the first and second output ports 106 and 107. The wiper arm 108 is similarly configured to couple additional sub-components of the first radio frequency signal to adjustable positions along two additional fixed arc-shaped transmission lines to perform phase shift operations for the additional sub-components of the first radio frequency signal that are output at the output ports coupled to the two additional fixed arc-shaped transmission lines. The first phase shifter 110 further includes a seventh output that is coupled to the first input port 105 via a power divider. The sub-component of the first radio frequency signal that is output at the seventh output port undergoes a fixed phase shift since this sub-component is not coupled to the moveable wiper arm 108.

As shown in FIG. 4, the second rotary wiper arm phase shifter 130 may include a first input port 131, a first output port 132, a second output port 133, a second printed trace 104 (an arc-shaped transmission line in the drawing) and a second wiper arm 109 electrically connected between the first output port 132 and the second output port 133. In some embodiments, the second wiper arm 109 may be configured as a second wiper arm PCB, and a first coupling portion and a second coupling portion are electrically connected to each other and printed on the second wiper arm PCB. The first coupling portion is coupled to the input port 131 of the second rotary wiper arm phase shifter 130 via a printed trace, and the second coupling portion is coupled to the second printed trace. The second wiper arm 109 may be configured to couple the first input port 131 to the second printed trace 104 and to be capable of sliding relative to the second printed trace 104 so as to adjust the phase change experienced by the sub-components of the RF signal received at the first input port 131 that are output at the corresponding output ports 132 and 133. In other words, the rotatable second wiper arm 109 is configured to couple first and second sub-components of the second radio frequency signal first input port to an adjustable position along the fixed arc-shaped transmission line 104 to perform a phase shift operation for the first and second sub-components of the second radio frequency signal that are output at the first and second outputs 132, 133. The wiper arm 109 is similarly configured to couple additional sub-components of the second radio frequency signal to adjustable positions along two additional fixed arc-shaped transmission lines to perform phase shift operations for the additional sub-components of the second radio frequency signal that are output at the output ports coupled to the two additional fixed arc-shaped transmission lines. The second phase shifter 130 further includes a seventh output that is coupled to the first input port 131 via a power divider. The sub-component of the second radio frequency signal that is output at the seventh output port undergoes a fixed phase shift since this sub-component is not coupled to the moveable wiper arm 109.

Each phase shifter may have, for example, 5, 7, 9 or more output ports. In the illustrated embodiment, the phase shifter has 7 output ports, of which 6 are differentially variably phase-shifted and 1 maintains an output of a fixed phase. However, an output that has a fixed phase relation with the input is optional. As a result, the first phase shifter 110 and the second phase shifter 130 may respectively perform 1:7 of power distribution along the radio transmission direction (i.e., each phase shifter 110, 130 may divide radio frequency signals input thereto into seven sub-components, which may or may not have the same magnitude). In other embodiments, the first phase shifter 110 and the second phase shifter 130 may also respectively perform, for example, 1:5 or 1:9 or other ratios (including even ratios) of power distribution along the radio transmission direction. However, with the phase shifters 110, 130 integrated with more output ports, the limited wiring space on the printed circuit board becomes more compact, thereby narrowing the gap between the transmission lines.

In addition to a phase shift circuit, each phase shifter printed circuit board further includes a filter bank that includes a plurality of individual filters. As shown in FIGS. 3 and 4, the first filter bank 120 includes seven individual filters. The input of each filter is connected to a corresponding output port of the first rotary wiper arm phase shifter 110. Similarly, the second filter 140 is schematically depicted as a second filter bank that includes a plurality of individual filters. The input of each filter in the second filter bank 140 is connected to a corresponding output port of the second rotary wiper arm phase shifter 130. An output of each filter in the first filter bank 120 and a corresponding output of a respective filter in the second filter bank 140 may be electrically connected with each other and together electrically connected to or jointly form a common output port 122 of the multi-band phase shifter assembly 122. In other words, each common output port 122 of the multi-band phase shifter assembly 100 may be electrically connected to an output end of a respective filter in the first filter bank 120 and to an output of a respective filter in the second filter bank 140, respectively. In the illustrated embodiment, the multi-band phase shifter assembly 100 exemplarily has 7 common output ports 122, which respectively feed the corresponding radiating elements.

In the illustrated embodiment, the first filter bank 120 and the second filter bank 140 may be printed as filter microstrip lines (for example, resonant stubs, or stepped impedance microstrip lines) on corresponding circuit printed boards and printed integrally with corresponding phase shift circuits. In other words, the first rotary wiper arm phase shifter 110 and the corresponding first filter bank 120 may be integrated on a first printed circuit board, and the second rotary wiper arm phase shifter 130 and the corresponding second filter bank 140 may be integrated on a second printed circuit board. Such an integration structure is advantageous in that it can simplify the composition of the antenna system and can also save space. For example, unnecessary cable connections can be omitted.

The first filter bank 120 may be configured to pass the sub-components of the first radio frequency signal while blocking the sub-components of the second radio frequency signal, and the second filter 140 may be configured to pass the sub-components of the second radio frequency signal while blocking the sub-components of the first radio frequency signal. In some embodiments, the first filter bank 120 and the second filter bank 140 may be respectively configured as band-rejection filters. In some embodiments, the first filter bank 120 and the second filter bank 140 may be respectively configured as band-pass filters.

In the illustrated embodiment, each corresponding filter may be formed by providing one or more resonant stubs along a transmission line, which can be used as a band-rejection filter to block energy in a specific frequency band. The resonant frequency mainly depends on the length of the stub(s) and how the stub(s) is/are terminated, for example, a quarter-wavelength open stub or a half-wavelength short-circuit stub.

It should be understood that those skilled in the art can easily recognize other types of filters, which can be used without departing from the scope and spirit of the present disclosure. In some embodiments, the filters may be configured separately from the phase shifter and may be electrically connected with each other via a coaxial cable. In some embodiments, the first filter bank 120 and/or the second filter bank 140 may be configured as notch filters, respectively. In some embodiments, the first filter bank 120 and/or the second filter bank 140 may be configured as cavity filters, respectively. Details are not described herein again.

Figure 6:
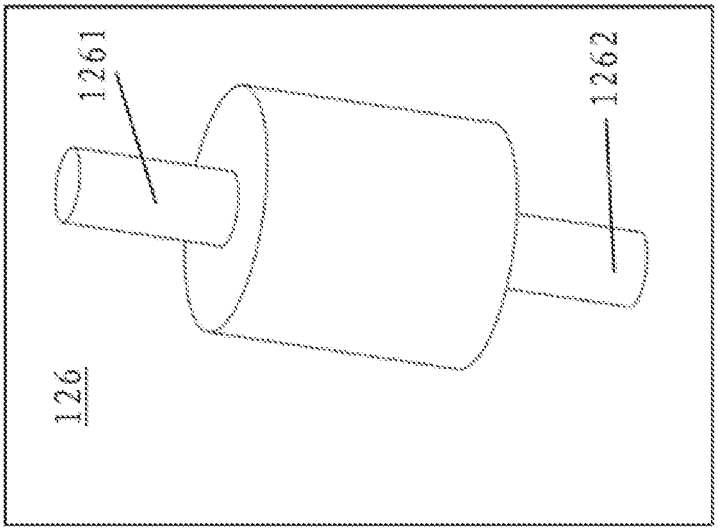
FIG. 6 is a perspective view of the conductive structure of FIG. 5.
Figure 5:
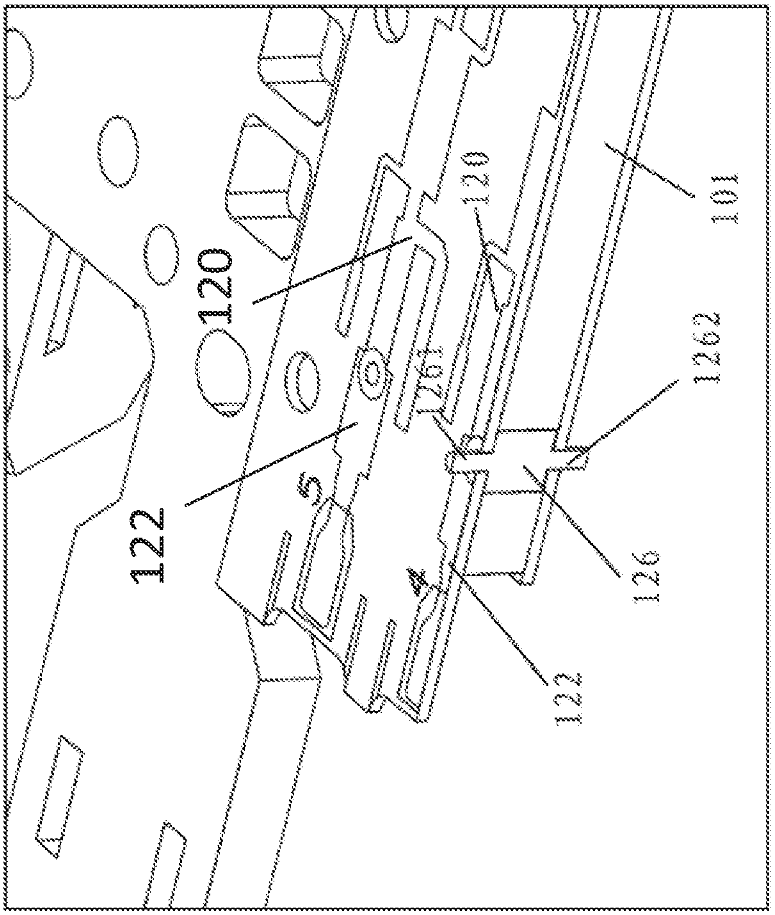
FIG. 5 is a partial sectional perspective view of the multi-band phase shifter assembly of FIG. 3 that shows a conductive structure in the multi-band phase shifter assembly.

Referring to FIGS. 5 and 6, a conductive structure 126 for electrically connecting the first filter 120 and the second filter 140 in the multi-band phase shifter assembly 100 according to some embodiments of the present disclosure is shown in detail. The multi-band phase shifter assembly 100 is configured to feed the sub-components of the radio frequency signals to respective sub-arrays of radiating elements of the radiating element array 20 via the coaxial cables 134 (as shown in FIGS. 1, 3 and 4). Common output ports 122 are provided on the multi-band phase shifter assembly 100 for electrically connecting each coaxial cable to a respective sub-array. These common output ports 122 may be arranged at lateral edges of the multi-band phase shifter assembly 100 or the corresponding printed circuit board, so that the end portion of the coaxial cable extends in a direction substantially parallel to the printed circuit board and is welded thereto. Such a welding operation is relatively efficient and simple.

Continuing to refer to FIG. 5, each common output port 122 may be electrically connected to an output of a respective filter in the first filter bank 120. The outputs of the filters of the second filter bank 140 on the back side may be electrically connected to the corresponding outputs of the filters of the first filter bank 120 via the conductive structures 126 and then electrically connected to the corresponding common output port 122. As seen in FIG. 1, the sub-components of the first radio frequency signal may reach the common output ports 122 via the first phase shifter 110 and the first filter bank 120 and may be fed to respective sub-arrays of the radiating element array 20 by the coaxial cables 134 that are connected to the common output ports 122. The second radio frequency signal may reach the common output ports 122 via the second phase shifter 130, the second filter bank 140, and the conductive structures 126 and may be fed to the respective sub-arrays of the radiating element array 20 by the coaxial cables 134 that are connected to the common output ports 122.

FIG. 5 also shows that each conductive structures 126 may span the substrate 101. A channel may be provided in the substrate 101. A first opening corresponding to the channel is provided on the first printed circuit board (on which the first phase shifter is implemented), and a second opening corresponding to the channel is provided on the second printed circuit board (on which the second phase shifter is implemented). A first end portion 1261 of the conductive structure 126 is electrically connected, for example, welded, to an output of a filter of the first filter bank 120 via the first opening, and a second end portion 1262 of the conductive structure 126 is electrically connected, for example, welded, to an output of a filter of the second filter bank 140 via the second opening, thereby achieving an electrical connection between the two filters. It should be understood that, in the current embodiment, the first printed circuit board and the second printed circuit board are two separate printed circuit boards, and the substrate between the two printed circuit boards is used to strengthen the structural strength of the entire phase shifter assembly.

FIG. 6 shows the exemplary conductive structure 126 in FIG. 5, which is configured in the form of a metal conductive pillar. The conductive structure 126 includes narrowed sections as electrical connection ends and a widened section configured to be received in the channel.

It should be understood that those skilled in the art can easily recognize other types of conductive structures 126, which can be used without departing from the scope and spirit of the present disclosure. In some embodiments, the conductive structure 126 may be configured as a coaxial connector.

The above superimposed structure of the multi-band phase shifter assembly 100 is advantageous. The wiring flexibility of each phase shifter 110, 130 along with the corresponding filter banks 120, 140 may be improved. In addition, based on wiring flexibility, welding ends 122 for the coaxial cables 134 may be provided at lateral edges of the multi-band phase shifter assembly 100, thereby facilitating the welding operation. Further, based on this superimposed structure, the width of the multi-band phase shifter assembly 100 may be significantly reduced, for example, by at least half compared to the embodiment of FIG. 2, thereby forming a compact structure. In some embodiments, the width of each phase shifter 110 and 130 may be less than 100 mm, 90 mm, 80 mm, 70 mm or even 50 mm, which is extremely advantageous for the originally compact internal space.

However, such a compact design size may cause the distance between the transmission lines of the multi-band phase shifter assembly 100, for example, the gap between filter branches, to become smaller, thereby creating coupling interference between adjacent transmission lines, for example, filtering branches, which may negatively affect the radio frequency performance of the multi-band phase shifter assembly 100, for example, the down tilt angle adjustment performance. In some cases, although a portion of coupling interference may be reduced by rewiring, this may negatively impact filter performance and/or return loss performance. Furthermore, in some cases, the coupling interference may be partially reduced by providing slots on the ground layer, but this may in turn result in a risk of leakage of RF signal.

As a result, the multi-band phase shifter assembly 100 of the present disclosure may include: one or a plurality of first metasurface decoupling elements 81, each of which may be printed within a gap between two adjacent filters of the first filter bank 120; one or a plurality of second metasurface decoupling elements 82, each second metasurface decoupling element 82 may be printed within a gap between two adjacent filters of the second filter bank 140.

It should be understood that corresponding metasurface decoupling elements 81' and 82' may be provided between adjacent filters in the multi-band phase shifter assembly 100 of the second embodiment, and also the multi-band phase shifter assembly 100' of the first embodiment, as shown in FIG. 2. It will also be appreciated that metasurface decoupling elements 81, 82 may be placed in between other portions of adjacent transmission lines to reduce coupling therebetween.

Continuing to FIGS. 3 and 4, the multi-band phase shifter assembly 100 may include a plurality of first metasurface decoupling elements 81 and a plurality of second metasurface decoupling elements 82, each first metasurface decoupling element 81 is arranged within a gap between two adjacent filters of the first filter bank 120, respectively, for at least partially reducing coupling between two the adjacent filters, for example, filter branches, and each second metasurface decoupling element 82 is arranged within a gap between two adjacent filters of the second filter bank 140, respectively, for at least partially reducing coupling between the adjacent filters, for example, filter branches. It should be understood that the corresponding metasurface decoupling elements extend substantially following the trajectory and/or shape of the gap between two adjacent filters. In other words, when the gap between two adjacent filters has a locally curved shape, the metasurface decoupling element may also extend locally curved.

It should be understood that the corresponding metasurface decoupling elements need not be provided between every pair of adjacent filters, but only for those pairs of filters having large coupling interferences and/or narrow gaps therebetween. For example, when the coupling interference between two adjacent filters exceeds a predetermined threshold, a metasurface decoupling element may be printed therebetween. For example, when the gap between two adjacent filters is smaller than a predetermined value, for example, 10 mm, 8 mm, 6 mm, 4 mm or 2 mm or even 1 mm, the corresponding metasurface decoupling element may be printed therebetween.

Each metasurface decoupling element may include or be configured as a plurality of periodically arranged metal pattern units. The frequency characteristics of the metasurface decoupling element may be adjusted by changing the shape, number, and/or arrangement of the metal pattern units.

To adapt to the frequency characteristics of the filters of the first filter bank 120, the first metasurface decoupling elements 81 may be configured to present decoupling characteristics at least within the first operating frequency band. To adapt to the frequency characteristics of the filters of the second filter bank 140, the second metasurface decoupling elements 82 may be configured to present decoupling characteristics at least within the second operating frequency band.

When the coupling between two adjacent filters of the first filter bank 120 is inductive coupling/capacitive coupling, the first metasurface decoupling elements 81 may be configured as capacitive decoupling elements/inductive decoupling elements at least within the first operating frequency band, so as to at least partially cancel the inductive coupling/capacitive coupling between the two filters. When the coupling between two adjacent filters of the second filter bank 140 is inductive coupling/capacitive coupling, the second metasurface decoupling elements 82 may be configured as capacitive decoupling elements/inductive decoupling elements at least within the second operating frequency band so as to at least partially cancel the inductive coupling/capacitive coupling between the two filters.

Figure 7:
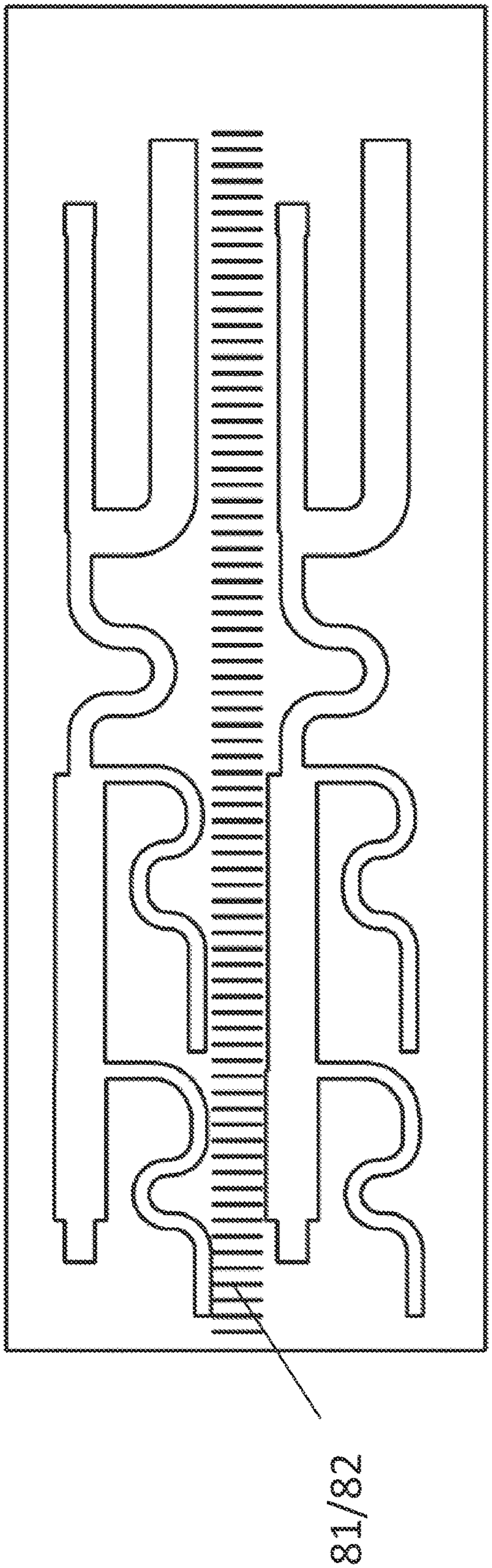
FIG. 7 is a front view of a first arrangement of a metasurface decoupling element according to some embodiments of the present disclosure.
Figure 8:
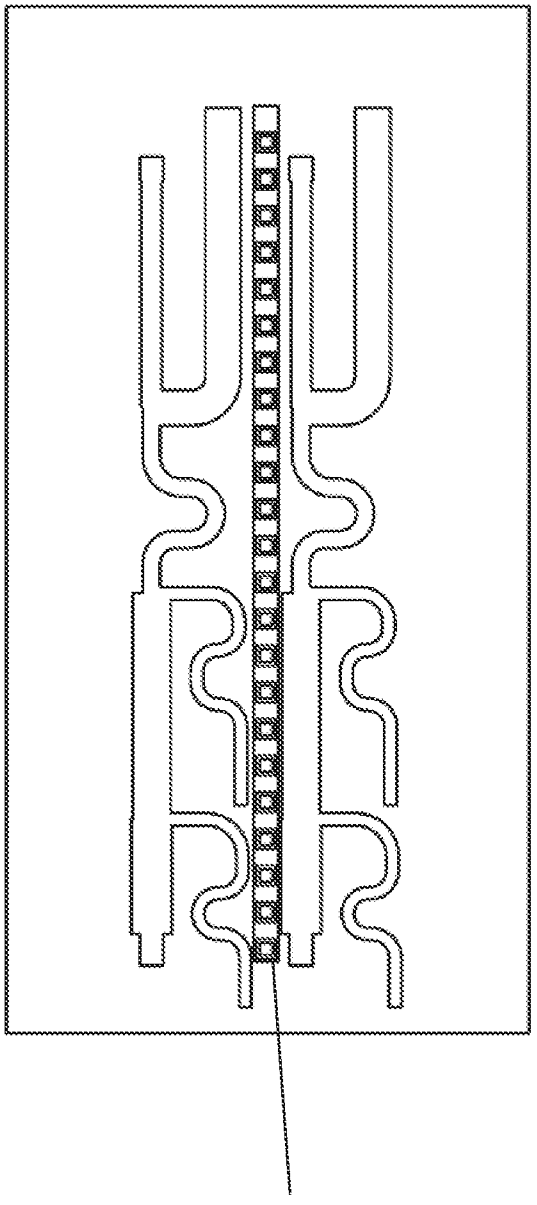
FIG. 8 is a front view of a second arrangement of a metasurface decoupling element according to some embodiments of the present disclosure.

In some embodiments, the number, shape and/or arrangement of the metal pattern units of the first metasurface decoupling elements 81 may be configured differently than the number, shape and/or arrangement of the metal pattern units of the second metasurface decoupling elements 82. As shown in FIGS. 7 and 8, two exemplary embodiments of metasurface decoupling elements are shown, respectively, which have different metal pattern unit shapes respectively. As shown in FIG. 7, the metasurface decoupling elements 81, 82 include a plurality of trace sections spaced apart from each other and arranged in parallel, each trace section extends from the first transmission line towards the second transmission line. As shown in FIG. 8, the metasurface decoupling elements 81, 82 include a plurality of hollow trace frames spaced apart from each another and arranged linearly. In some embodiments, the frequency characteristics of the metasurface decoupling element may also be changed by adjusting the number of metal pattern units. For example, an array of metal pattern units having a first length may be provided between adjacent filters of the first filter bank 120, while an array of metal pattern units having a second length different from the first length may be provided between adjacent filters of the second filter bank 140. It should be understood that the shape, number and/or arrangement of the metal pattern units of the metasurface decoupling element may have a variety of variations, and should not be limited to the solutions described in specific embodiments.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

What is claimed is:

1. A radio frequency device, including:

a substrate;

a first radiating element;

a second radiating element;

a first transmission line on a first major surface of the substrate, the first transmission line coupled to the first radiating element;

a second transmission line adjacent to the first transmission line and on the first major surface of the substrate, the second transmission line coupled to the second radiating element; and a metasurface decoupling element printed on the first major surface of the substrate, where the metasurface decoupling element is arranged between the first transmission line and the second transmission line.

2. The radio frequency device according to claim 1, wherein the metasurface decoupling element includes a plurality of periodically arranged metal pattern units.

3. The radio frequency device according to claim 2, wherein the gap between the first transmission line and the second transmission line is smaller than 10 mm.

4. The radio frequency device according to claim 1, wherein the metasurface decoupling element is configured as an inductive decoupling element at least within an operating frequency band of the radio frequency device.

5. The radio frequency device according to claim 1, wherein the metasurface decoupling element is configured as a capacitive decoupling element at least within an operating frequency band of the radio frequency device.

6. The radio frequency device according to claim 1, wherein the metasurface decoupling element includes a plurality of trace sections spaced apart from each other and arranged in parallel, and wherein each trace section extends from the first transmission line towards the second transmission line.

7. A radio frequency device, including:

a substrate;

a first transmission line on a first major surface of the substrate;

a second transmission line adjacent to the first transmission line and on the first major surface of the substrate; and a metasurface decoupling element on the first major surface of the substrate, where the metasurface decoupling element is arranged between the first transmission line and the second transmission line, wherein the radio frequency device is configured as a duplexer or a phase shifter.

8. A radio frequency device, including:

a substrate;

a first transmission line on a first major surface of the substrate;

a second transmission line adjacent to the first transmission line and on the first major surface of the substrate; and a metasurface decoupling element on the first major surface of the substrate, where the metasurface decoupling element is arranged between the first transmission line and the second transmission line, wherein the first transmission line comprises a plurality of first filters and the second transmission line comprises a plurality of second filters.

9. The radio frequency device according to claim 8, wherein the metasurface decoupling element comprises a first metasurface decoupling element and a second metasurface decoupling element.

10. The radio frequency device according to claim 9, further comprising:

a first phase shifter, configured to perform a phase shift operation on sub-components of a first radio frequency signal in a first frequency band; and a second phase shifter, configured to perform a phase shift operation on sub-components of a second radio frequency signal in a second frequency band, the second frequency band being different from the first frequency band, wherein the plurality of first filters are configured to pass the first radio frequency signal while blocking the second radio frequency signal, in which, an input of each first filter is connected to a corresponding output port of the first phase shifter, wherein the plurality of second filters are configured to pass a second radio frequency signal while blocking the first radio frequency signal, in which, an input of each second filter is connected to a corresponding output port of the second phase shifter, wherein a first metasurface decoupling element is arranged within a first gap between two adjacent first filters, and wherein a second metasurface decoupling element is arranged within a second gap between two adjacent second filters.

11. The radio frequency device according to claim 10, wherein the first metasurface decoupling element is configured as an inductive decoupling element at least within the first frequency band; and the second metasurface decoupling element is configured as an inductive decoupling element at least within the second frequency band.

12. The radio frequency device according to claim 10, wherein the first metasurface decoupling element is configured as a capacitive decoupling element at least within the first frequency band; and the second metasurface decoupling element is configured as a capacitive decoupling element at least within the second frequency band.

13. The radio frequency device according to claim 10, wherein the first metasurface decoupling element and the second metasurface decoupling element each include a plurality of periodically arranged metal pattern units.

14. The radio frequency device according to claim 8, wherein a number, shape and/or arrangement of the metal pattern units of the first metasurface decoupling element is different from a number, shape and/or arrangement of the metal pattern units of the second metasurface decoupling element.

15. The radio frequency device according to claim 8, wherein the metasurface decoupling element comprises:

a plurality of first metasurface decoupling elements, wherein each first metasurface decoupling element is arranged within a respective first gap between two adjacent first filters; and a plurality of second metasurface decoupling elements, wherein each second metasurface decoupling element is arranged within a respective second gap between two adjacent second filters.

16. The radio frequency device according to claim 10, wherein the first phase shifter is mounted on a first major surface of the substrate and the second phase shifter is mounted on a second major surface of the substrate opposite the first major surface, and the first metasurface decoupling element is on the first major surface of the substrate and the second metasurface decoupling element is on the second major surface of the substrate.

17. The radio frequency device according to claim 16, further comprising a conductive structure extending within the substrate between the first major surface and the second major surface, the conductive structure configured to electrically connect an output of a first filter with a corresponding output of a second filter.

18. The radio frequency device according to claim 16, wherein the first metasurface decoupling element and the second metasurface decoupling element each include a plurality of periodically arranged metal pattern units, and wherein a number, shape and/or arrangement of metal pattern units of the first metasurface decoupling element is different from a number, shape and/or arrangement of the metal pattern units of the second metasurface decoupling element.

19. The radio frequency device according to claim 7, further comprising:

a first radiating element; and a second radiating element, wherein the first transmission line is coupled to the first radiating element, and wherein the second transmission line is coupled to the second radiating element.

20. The radio frequency device according to claim 7, wherein the substrate is a printed circuit board substrate; and the first transmission line, the second transmission line, and the metasurface decoupling element are printed metal patterns on the first major surface of the substrate.

* * * * *